(12) United States Patent
Klein et al.

(10) Patent No.: US 7,938,963 B2
(45) Date of Patent: May 10, 2011

(54) FUEL FILTER SYSTEM

(75) Inventors: Gunnar-Marcel Klein, Spiegelberg (DE); Uwe Weipprecht, Boennigheim (DE); Steffi Kiedaisch, Ludwigsburg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 1632 days.

(21) Appl. No.: 11/229,638

(22) Filed: Sep. 20, 2005

(65) Prior Publication Data

US 2006/0006109 A1    Jan. 12, 2006

Related U.S. Application Data

(63) Continuation of application No. PCT/EP2004/050341, filed on Mar. 22, 2004.

(30) Foreign Application Priority Data

Mar. 21, 2003  (DE) .................................. 103 13 867

(51) Int. Cl.
- *B01D 17/04* (2006.01)
- *B01D 17/022* (2006.01)
- *B01D 29/56* (2006.01)
- *B01D 29/58* (2006.01)

(52) U.S. Cl. ........ 210/295; 210/299; 210/313; 210/315; 210/489; 210/490; 210/DIG. 5

(58) Field of Classification Search ................ 210/299, 210/295, 313, 315, 489, 490, DIG. 5
See application file for complete search history.

(56) References Cited

U.S. PATENT DOCUMENTS

| | | | | |
|---|---|---|---|---|
| 2,837,214 A * | 6/1958 | Kasten | ............................. | 210/300 |
| 3,144,407 A * | 8/1964 | Olmos | ............................. | 210/307 |
| 3,249,229 A * | 5/1966 | Kasten | ............................. | 210/195.1 |
| 4,372,847 A * | 2/1983 | Lewis | ............................. | 210/86 |
| 6,042,722 A * | 3/2000 | Lenz | ............................. | 210/95 |

FOREIGN PATENT DOCUMENTS

| | | |
|---|---|---|
| DE | 34 40 506 A | 5/1986 |
| GB | 2 115 305 A | 9/1983 |

OTHER PUBLICATIONS

International Search Report based on International Application No. PCT/EP2004/050341, Filed Mar. 22, 2004.

* cited by examiner

*Primary Examiner* — Thomas M Lithgow
(74) *Attorney, Agent, or Firm* — James Hasselbeck

(57) ABSTRACT

A fuel filter system, particularly a diesel filter, including a housing, a particle filter arranged in the housing, and a coalescer element mounted on the particle filter. Fuel passes successively through the serially connected coalescer and particle filter. The coalescer element improves the separation of any water contained in the fuel to be filtered, while exhibiting no or no significant fuel-filtering properties.

18 Claims, 2 Drawing Sheets

FUEL FILTER SYSTEM

CROSS REFERENCE TO RELATED APPLICATIONS

This application is a continuation of international patent application no. PCT/EP2004/050341, filed Mar. 22, 2004 designating the United States of America and published in German as WO 2004/082804 on Sep. 30, 2004, the entire disclosure of which is incorporated herein by reference. Priority is claimed based on Federal Republic of Germany patent application no. DE 103 13 867.6, filed Mar. 21, 2003.

BACKGROUND OF THE INVENTION

The present invention relates to a fuel filter system, in particular a diesel filter, comprising a particle filter provided in a housing.

U.S. Pat. No. 5,084,170 describes a fuel filter having a housing in which a main filter element and a secondary filter element are provided. Fuel flows through the main filter element from the inside to the outside. In addition, it has coalescing properties so that any water present in the fuel coalesces, i.e., larger droplets of water are formed and enter a water collecting space. In order for the water droplets not to flow through the secondary filter element, the filter element is provided with hydrophobic materials, in particular silicone so that an external water barrier is formed. The main filter element and the secondary filter element are both made of a folded filter paper or filter nonwoven. Although the fuel flows through the first filter element from the inside to the outside, it flows through the second filter element from the outside to the inside, and the filtered fuel is sent to a pipe of a clean liquid line. One disadvantage of this design is that because of its active filter properties, the main filter element becomes loaded with dirt, which reduces an/or interferes with flow through the filter. Furthermore, the main filter element loses its coalescent properties over a period of time, which means that on the whole the filter system loses its hydrophobic properties and/or the hydrophobic effect declines until the filter element is replaced.

SUMMARY OF THE INVENTION

Accordingly, it is an object of the present invention to provide an improved fuel filter element.

Another object of the invention is to provide a fuel filter system which avoids the disadvantages described above and ensures highly effective separation over the entire lifetime of the filter element.

A further object of the invention is to provide a fuel filter in which flow through the filter is substantially maintained throughout the operating life of the filter.

An additional object of the invention is to provide a fuel filter in which the ability of the filter to remove water from the filtered fuel is maintained throughout the operating life of the filter.

These and other objects are achieved in accordance with the present invention by providing a fuel filter comprising a filter housing, a particle filter element disposed in the housing between a housing inlet and a housing outlet, and a coalescer element for improving separation of water from fuel passed through the filter, the coalescer element being arranged in the housing upstream from the particle filter element so that fuel passing through the filter flows first through the coalescer element and then through the particle filter, wherein the coalescer element has no significant particle filtering properties.

One of the advantages of this invention is that the coalescer element cannot become clogged by any dirt particles, but instead remains adequately permeable even when there is a very large amount of dirt and retains its coalescing properties over the entire lifetime of the filter element.

In one advantageous embodiment, the coalescer element is an element pleated in the form of a star having a relatively small flow-through area, amounting to less than one-third of the filter area of the particle filter.

In an alternative embodiment, the coalescer element is comprised of an open-pored nonwoven material that does not have any active filter properties.

In accordance with yet another advantageous embodiment of this invention, to further support the separation of water from fuel, the particle filter is made of a hydrophobic material and/or has a hydrophobic surface which prevents the entrance of water into the particle filter. Water which separates is collected in the lower area of the particle filter or beneath the particle filter in a collecting area.

According to a still further embodiment of this invention, the particle filter is comprised of multiple layers of a filter medium. It has proven successful here in particular for the layer on the oncoming flow side to be made of a melt-blown nonwoven and for the layer on the clean side to be made of an optionally calendared or compressed filter paper containing primarily cellulose.

The coalescer element may be, for example, a polyester nonwoven or a polyamide [nylon] nonwoven, through which the filter flow passes either axially or radially. Fiberglass packings may also be used with the fuel flowing axially or radially through them. Likewise, cotton, linters or rayon is also suitable, in which case the nonwoven packings will have a hydrophilic impregnation.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described hereinafter in further detail with reference to illustrative preferred embodiments shown in the accompanying drawing figures, in which.

DETAILED DESCRIPTION OF PREFERRED EMBODIMENTS

Figure 1:
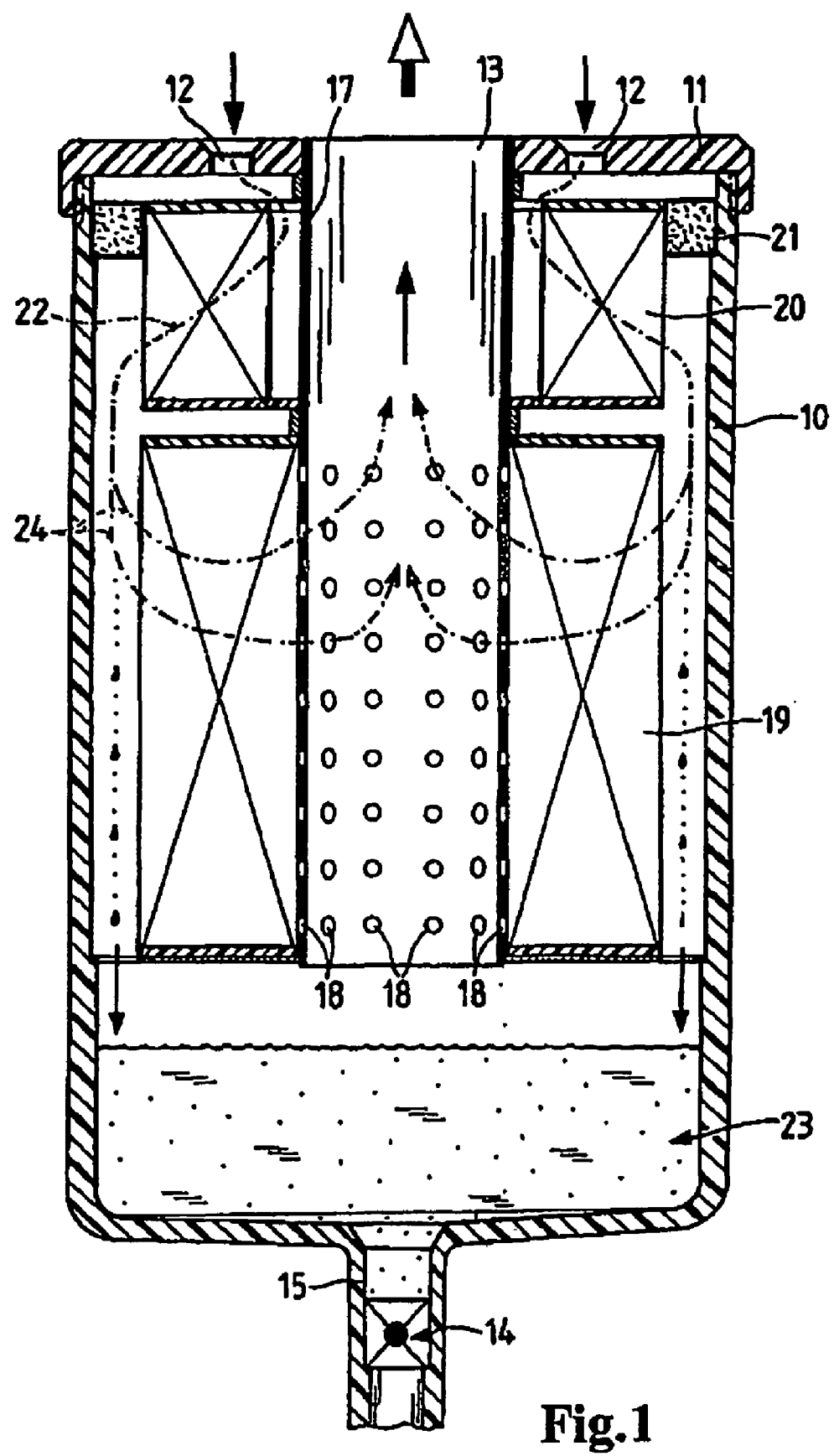
FIG. 1 is a sectional schematic diagram of a fuel filter according to the present invention.

FIG. 1 shows a fuel filter according to the invention comprising a housing 10 which is constructed essentially in the form of a pot. The upper part of the housing 10 is closed by a cover 11. Cover 11 has inlet openings 12 for fuel to flow in and an outlet opening 13 through which filtered fuel can be removed. A water discharge valve 14 is provided on a pipe connection 15 at the lower end of the housing 10. Inside the housing there is a rising pipe 17, which is permeable, i.e., provided with openings 18, in the area of the particle filter element.

The particle filter 19 which is placed over the rising pipe 17 is comprised of a filter material folded in zigzag pleats, which can, for example, be composed of a plurality of layers. A coalescer element 20 is provided above the particle filter 19. In the example illustrated here the coalescer element is also made of a material having zigzag pleating. This medium may be a polyester material, a polyamide or another material having coalescing properties for water. Other materials from which the coalescer element may be made include sheep's wool, glass wool, polyethylene or polypropylene, and the coalescer element may optionally be impregnated with a hydrophilic agent. Examples of preferred materials from which the coalescer element can be made include graded, dry-laid staple fiber nonwoven, a melt-blown nonwoven impregnated with a hydrophilic agent, a fiberglass medium optionally impregnated with a hydrophilic agent, or a metal wire cloth. In one particularly preferred embodiment, the coalescer element comprises a web of cellulose fibers impregnated with a hydrophilic agent and folded in a star pattern.

Coalescer element 20 is attached to the housing 10 via a seal 21. Advantageously, coalescer element 20 may have a a flow-through area less than one-third of the filter area of the particle filter.

The medium to be cleaned, e.g., diesel fuel, flows in through the inlet opening 12 and then flows through the coalescer element 20 from the inside to the outside in accordance with arrow 22. Any water in the fuel coalesces to larger collections or droplets, and then flows downward and collects in an underlying water collecting area or reservoir 23 at the bottom of the filter housing. The fuel to be cleaned flows through the filter element from the outside to the inside in accordance with the arrows 24, and is cleaned in the filter element 19. Advantageously, the particle filter 19 has a hydrophobic surface to facilitate water separation.

If desired, the particle filter 19 may be comprised of multiple layers of a filter medium which exhibit increasing degrees of separation for the particles to be filtered out in the direction of fuel flow through the filter. Preferably, the filter layer on the oncoming flow side is made of synthetic fibers, and the filter layer on the outgoing flow side is made of paper containing predominantly cellulose. In one particularly preferred embodiment, for example, the filter layer on the oncoming flow side comprises a melt-blown nonwoven having a basis weight of 15 grams to 300 grams per square meter, and the filter layer on the outgoing flow side comprises an optionally calendared or compressed filter paper containing predominantly cellulose having a basis weight of about 50 grams to 300 grams per square meter. In accordance with another preferred embodiment, the particle filter may further comprise an optionally calendared melt-blown nonwoven layer having a basis weight of 15 grams to 300 grams per square meter between the filter layer on the oncoming flow side and the filter layer on the outgoing flow side.

Upon leaving filter element 19, the cleaned fuel flows through the openings 18 in the rising pipes 17 and the outlet opening 13 of the filter system. If water has collected in the water reservoir 23 up to a certain level, it can be removed through the water discharge valve 14.

Figure 2:
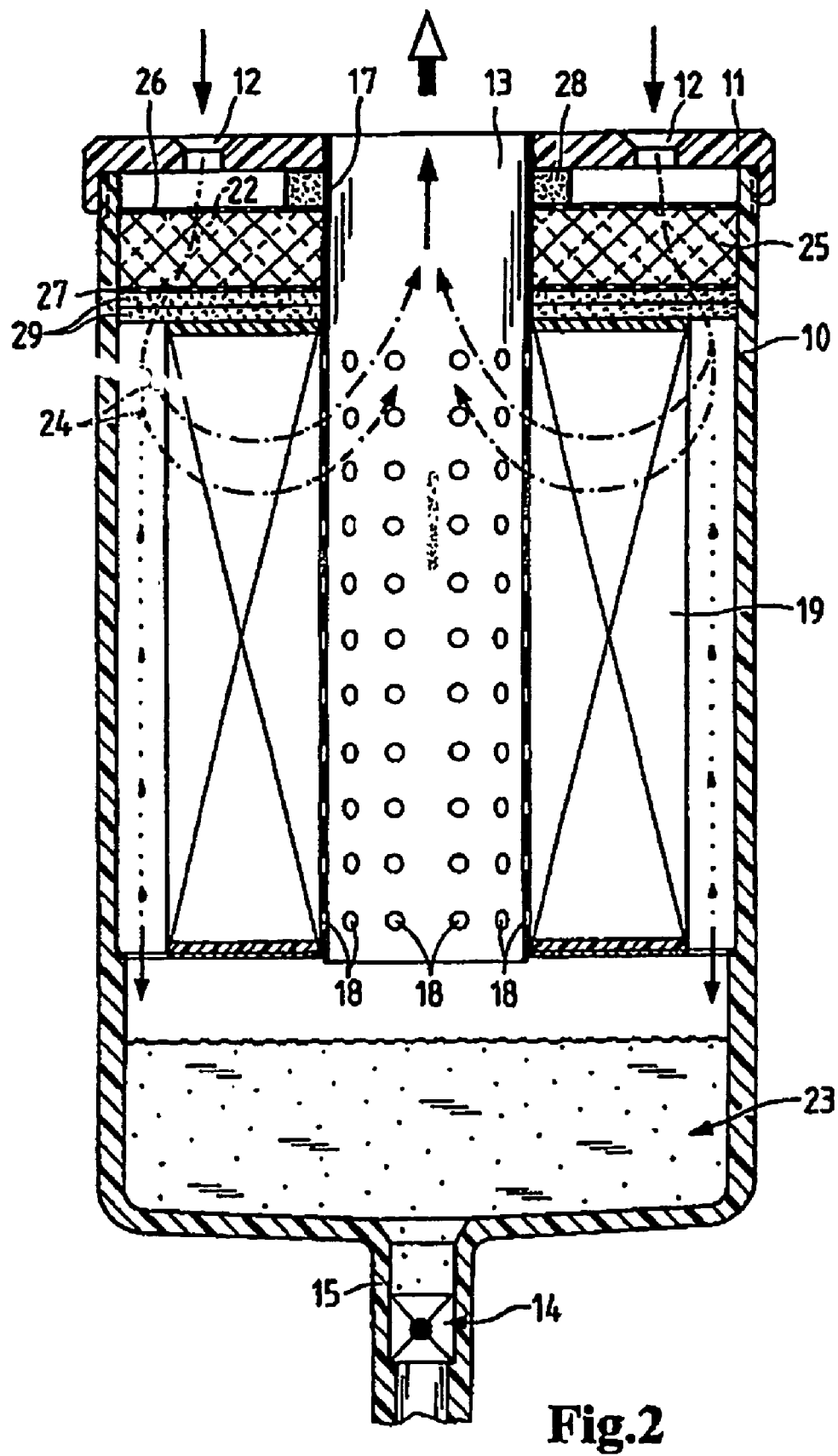
FIG. 2 is a sectional schematic diagram of an alternative fuel filter design in accordance with the present invention.

FIG. 2 shows an alternative embodiment of the invention in which like parts are identified by like reference numerals. In this embodiment instead of a coalescer element pleated in zigzag pleats, a cylindrical foam body 25 is used through which the fuel to be filtered may flow either radially or axially. This foam body is embedded between two perforated plates or supporting grids or grates 26 and 27 made, for example, of synthetic resin material (i.e., plastic). The upper supporting grate is provided with a gasket 28 which is in contact with the rising pipe 17. Instead of a foam body, a cylindrical glass wool packing or a packing material having a coalescent effect may be used.

One or two drainage layers 29, which allow liquid to flow in the radial direction, may optionally be provided between the supporting grate 27 and the particle filter element 19. The liquid to be cleaned can thus flow through the particle filter from the outside to the inside, and the water that is separated can be diverted downward in the area of the housing wall.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A fuel filter comprising
a filter housing,
a riser pipe arranged vertically within said housing, said riser pipe having an upper end in fluid flow communication with said housing outlet,
a particle filter element disposed in said housing between a housing inlet and a housing outlet, said particle filter element arranged over an outside surface of said riser pipe, and
a coalescer element improving separation of water from fuel is arranged within said filter housing, said coalescer element arranged over an outside surface of said riser pipe and positioned axially above said particle filter element, said coalescer element being arranged in said housing upstream from the particle filter element so that fuel passing through the filter flows first through the coalescer element and then through the particle filter,
wherein said riser pipe in an area of said particle filter element has a openings in a wall of said riser pipe through which filtered fuel from said particle filter flows into said riser pipe and then to said housing outlet through said riser pipe,
wherein no prefilter is arranged in said housing upstream of said coalescer element,
wherein the coalescer element has no significant particle filtering properties.

2. A fuel filter according to claim 1, wherein the coalescer element is a star-shaped pleated element having a flow-through area less than one-third of the filter area of the particle filter.

3. A fuel filter according to claim 1, wherein the coalescer element is a nonwoven body having an essentially cylindrical shape through which fuel flows radially.

4. A fuel filter according to claim 1, wherein the coalescer element is a nonwoven body having an essentially cylindrical shape through which fuel flows axially.

5. A fuel filter according to claim 1, wherein the particle filter has a hydrophobic surface, and water separated from the fuel is collected in a collecting area at the bottom of the housing underneath the particle filter.

6. A fuel filter according to claim 1, wherein the particle filter is comprised of multiple layers of a filter medium which layers exhibit an increasing degree of separation for the particles to be filtered out in the direction of flow.

7. A fuel filter comprising:
a filter housing;
a particle filter element disposed in said housing between a housing inlet and a housing outlet; and a coalescer element for improving separation of water from fuel passed through the filter, said coalescer element being arranged in said housing upstream from the particle filter element so that fuel passing through the filter flows first through the coalescer element and then through the particle filter, wherein the coalescer element has no significant particle filtering properties, wherein the particle filter is comprised of multiple layers of a filter medium which layers exhibit an increasing degree of separation for the particles to be filtered out in the direction of flow, wherein the filter layer on the oncoming flow side is made of synthetic fibers, and wherein the filter layer on the outgoing flow side is made of paper containing predominantly cellulose.

8. A fuel filter according to claim 7, wherein the filter layer on the oncoming flow side comprises a melt-blown nonwoven having a basis weight of 15 grams to 300 grams per square meter, and the filter layer on the outgoing flow side comprises a filter paper containing predominantly cellulose having a basis weight of about 50 grams to 300 grams per square meter.

9. A fuel filter according to claim 8, wherein the filter layer on the outgoing flow side is calendared or compressed.

10. A fuel filter according to claim 7, comprising a third layer between the filter layer on the oncoming flow side and the filter layer on the outgoing flow side, said third layer comprising a melt-blown nonwoven having a basis weight of 15 grams to 300 grams per square meter.

11. A fuel filter according to claim 10, wherein said third layer is calendared.

12. A fuel filter according to claim 1, wherein the coalescer element is made of a material selected from the group consisting of sheep's wool, glass wool, polyester, polyethylene, polypropylene or polyamide.

13. A fuel filter according to claim 12, wherein said material is impregnated with a hydrophilic agent.

14. A fuel filter according to claim 1, wherein the coalescer element is comprised of a graded, dry-laid staple fiber nonwoven, a melt-blown nonwoven impregnated with a hydrophilic agent, an unimpregnated fiberglass medium, a fiberglass medium impregnated with a hydrophilic agent, or a metal wire cloth.

15. A fuel filter according to claim 1, wherein the coalescer element comprises a web of cellulose fibers impregnated with a hydrophilic agent and folded in a star pattern.

16. A fuel filter according to claim 1, wherein at least one drainage layer is provided between the coalescer element and the particle filter.

17. A fuel filter according to claim 1, wherein the coalescer element is provided with a perforated plate or a supporting grid on the oncoming flow side and on the outgoing flow side.

18. A fuel filter according to claim 17, wherein each perforated plate or supporting grid is made of a synthetic resin material.

\* \* \* \* \*